US008607656B2

(12) United States Patent
Sommer

(10) Patent No.: US 8,607,656 B2

(45) Date of Patent: Dec. 17, 2013

(54) DRIVE DEVICE FOR A TILT ELEMENT OF A MOTOR VEHICLE

(75) Inventor: Uwe Sommer, Effelder (DE)

(73) Assignee: Brose Fahrzeugteile GmbH & Co. KG, Hallstadt, Hallstadt (DE)

(*) Notice: Subject to any disclaimer, the term of this patent is extended or adjusted under 35 U.S.C. 154(b) by 36 days.

(21) Appl. No.: 13/486,622

(22) Filed: Jun. 1, 2012

(65) Prior Publication Data

US 2012/0234116 A1 Sep. 20, 2012

Related U.S. Application Data

(63) Continuation of application No. PCT/EP2010/002771, filed on May 6, 2010.

(30) Foreign Application Priority Data

Dec. 11, 2009 (DE) ..................... 20 2009 016 813 U

(51) Int. Cl.
*F16H 55/17* (2006.01)

(52) U.S. Cl.
USPC ............................................. 74/435; 74/414

(58) Field of Classification Search
USPC ............................ 74/414, 413, 435, 457, 415
See application file for complete search history.

(56) References Cited

U.S. PATENT DOCUMENTS

| | | | | |
|---|---|---|---|---|
| 1,787,217 | A * | 12/1930 | Steere | 74/435 |
| 2,040,933 | A * | 5/1936 | Gillen | 74/319 |
| 2,253,270 | A * | 8/1941 | Golber | 74/437 |
| 2,399,925 | A * | 5/1946 | Hewlett, Jr. | 74/437 |
| 2,886,973 | A * | 5/1959 | Schunemann | 74/27 |
| 2,898,775 | A * | 8/1959 | Reid | 74/435 |
| 3,442,146 | A * | 5/1969 | Simpson | 74/84 R |
| 3,772,917 | A * | 11/1973 | Lutz et al. | 73/861.78 |
| 3,866,486 | A * | 2/1975 | Lechner | 74/425 |
| 3,890,853 | A * | 6/1975 | Feltz | 74/435 |
| 4,012,964 | A * | 3/1977 | Lee | 74/435 |
| 4,570,510 | A * | 2/1986 | Babak | 475/180 |
| 4,630,152 | A * | 12/1986 | Kilstofte | 360/251.2 |
| 6,056,348 | A | 5/2000 | Tsuda et al. | |
| 7,469,897 | B2 * | 12/2008 | Hiramoto et al. | 271/314 |

FOREIGN PATENT DOCUMENTS

| | | |
|---|---|---|
| DE | 42 18 507 A1 | 1/1993 |
| DE | 197 57 346 A1 | 6/1998 |
| DE | 20 2008 003 170 U1 | 8/2009 |

* cited by examiner

*Primary Examiner* — David M Fenstermacher

(74) *Attorney, Agent, or Firm* — Muncy, Geissler, Olds & Lowe, PLLC

(57) ABSTRACT

A drive device for a deployment element of a motor vehicle, in particular for a pivotable hinged window, which can be moved between an open position and a closed position in a motorized manner is provided. A spur gear transmission driven by an electric motor comprises an output gear having a coupling lever for coupling a deployment lever in a rotationally movable manner, a spur gear that meshes with the output gear, and an intermediate gear that is coaxial with the spur gear. The output gear has outer teeth having two teeth sections of different axial tooth width. The deployment lever that is coupled to the coupling lever extends in a plane of symmetry perpendicular to the rotational axes of the spur gear transmission.

14 Claims, 8 Drawing Sheets

DRIVE DEVICE FOR A TILT ELEMENT OF A MOTOR VEHICLE

This nonprovisional application is a continuation of International Application No. PCT/EP2010/002771, which was filed on May 6, 2010, and which claims priority to German Patent Application No. DE 20 2009 016 813.1, which was filed in Germany on Dec. 11, 2009, and which are both herein incorporated by reference.

BACKGROUND OF THE INVENTION

1. Field of the Invention

The invention relates to a drive device for a motor-driven tilt element that can be moved between an open position and a closed position, having an electric-motor driven spur gear drive. A tilt element can be understood to mean an outwardly opening closure part that is pivotable, which is to say hinged on one side, for example a vent window, a pop-up roof, or the like, in a motor vehicle.

2. Description of the Background Art

A drive mechanism is known from DE 197 57 346 C2, which corresponds to U.S. Pat. No. 6,056,348, and in which the driving force of an electric motor can be transmitted to a pivoting window via a worm-and-spur drive to a first link that is integral with an output shaft and a second link that is coupled with the first link. During an opening and closing motion of the window, the connection point between the two links moves along a curved path of approximately 180°, while the connection point between the second link and the window pane moves back and forth along a straight path. The curved path of the connection point extends on the side of the drive shaft opposite a pivot hinge for articulating the window pane that represents the circle center of a path forming a semicircle. The second link between the connection point and the window pane is curved in design in one embodiment, and thus surrounds the output shaft even when the vent window is closed.

In a power window actuator known from DE 42 18 507 C2, with an electric motor drive and multi-stage geared spindle drive, and with a similar pivoted lever mechanism with two levers connected together in an articulated manner whose articulation point for opening and closing the outwardly opening side window again is pivoted along an arcuate path about an axis of shaft rotation, the articulation point is located on the side opposite the window pane below the axis of rotation when the window is in the closed position. In this way, the window is secured against unwanted (manual) opening.

If such drive devices are also to be operable in so-called automatic travel, then they are subject in principle to the same legal requirements as window regulators for windows that can be raised and lowered, for which a maximum pinching force of typically 100N is permissible for a so-called 4 mm rod (upper pinch gap limit) in automatic travel in the direction of closure.

SUMMARY OF THE INVENTION

It is therefore an object of the invention to provide an especially suitable drive device that permits flexible installation while at the same time taking little installation space.

This object is achieved according to an embodiment of the invention in that a spur gear drive is provided that comprises an output gear with a molded-on coupling lever for rotary coupling of a tilt lever and a spur gear (pinion) meshing with the output gear as well as an intermediate gear that is coaxial with the spur gear. The output gear, the spur gear, and the intermediate gear are straight-tooth gears, which is to say gears with external teeth that extend straight in the axial direction. The output gear has external teeth with a first tooth section and with an adjoining second tooth section whose axial tooth face width is smaller than the axial tooth face width of the first tooth section.

The differing axial tooth face width of the output gear along its circumference, firstly, permits differing transmission of force from the driving spur gear to the output gear, and secondly ensures an especially small overall axial width of the spur gear drive, including the intermediate gear. The differing transmission of force is intentionally utilized in that the comparatively large axial tooth face width of the first tooth section of the output gear engages with the spur gear when the tilt element of the motor vehicle, in particular a vent window, travels into a closure seal with a comparatively high application of force during the closing process, and the spur gear drive is subjected to a correspondingly high load. In particular, the comparatively wide first tooth section stands in engagement with the associated spur gear when the tilt element is in its closed position.

In contrast, the second tooth section of the output gear, with its comparatively small axial tooth face width, engages the spur gear when the tilt element of the motor vehicle travels outside the seal with comparatively low application of force, and the spur gear drive is subjected to a correspondingly low load.

According to another aspect of the invention, the tilt lever, which is rotatably connected to the coupling lever and extends perpendicularly to the axes of rotation of the spur gear drive, is located in the plane of symmetry of the spur gear drive including of the intermediate gear coaxial to the spur gear. This mirror-image symmetry permits left-hand and right-hand installation of the same drive unit while simultaneously allowing the smallest possible axial installed width. To this end, the comparatively narrow second tooth section forms a suitable free space for the tilt lever coupled to the coupling lever during the adjustment motion thereof. The intermediate gear is located on one side of the plane of symmetry, while the tooth region of the first tooth section, which projects axially beyond the comparatively narrow, second tooth section, is located on the other side of the plane of symmetry.

The spur gear and the intermediate gear are arranged on a shared axis of rotation parallel to the axis of rotation of the output gear and are usefully connected to one another. The diameter of the intermediate gear is at least slightly smaller than the diameter of the output gear, and significantly larger than that of the spur gear. The axial tooth face width of the spur gear is greater than or equal to the axial tooth face width of the first tooth section. The pinion-like spur gear is aligned with the output gear on the side facing away from the intermediate gear.

The comparatively wide first tooth section suitably transitions linearly over a certain circumferential section of the output gear into the comparatively narrow second tooth section. For the sake of simplification and to save material, the external toothing of the output gear usefully is provided only on an external circumference that is relevant for the angle of rotation. Consequently, the output gear has a toothless circumferential section on the circumferential side opposite the two sections of toothing.

The coupling lever that appropriately is formed on the output gear has a receiving slot formed between two arms for a perforated lever head of the tilt lever. At its free end opposite the axis of rotation of the output gear, the coupling lever has a bearing eye for a mounting stud to mount the tilt lever on the coupling lever in a rotatable manner. In the installed position, in which the mounting stud usefully is latched or snap-fitted to the coupling lever, the mounting stud passes through the mutually aligned bearing eyes of the tilt lever and of the coupling lever. For this purpose, the bearing eye has a detent cam, which interlocks with an annular groove in the stud shank of the mounting stud. Especially simple component assembly is achieved by this means. The wall of the receiving slot of the applicable coupling lever arm on the gear wheel side constitutes a plane in which the edge-side plane of the recessed (second) tooth section lies. This plane delimits the free space of the tilt lever on the output gear side.

During an adjustment motion of the tilt element between its open position and its closed position, the coupling point between the coupling lever and the tilt lever travels along a semicircular adjustment path. In useful fashion, the adjustment motion or the semicircular path runs between two stops (stop points). These stops preferably are composed of mechanical damping elements. In the region that can be passed over by the tilt lever between these stops, the comparatively narrow, second tooth section of the output gear is recessed with respect to its first tooth section. The radial distance of the coupling point between the coupling lever and the tilt lever from the axis of rotation of the output gear is slightly larger than its crown circle radius, so that the output gear with its coupling point strikes the damping elements.

The spur gear drive along with the output gear, spur gear, and intermediate gear are usefully part of a multistage gear reducer with a worm gear. The latter is coupled on one side with the intermediate gear and meshes on the other side with a worm sitting on the drive shaft of an electric motor.

The external toothing of the output gear appropriately covers an angle of rotation of less than 200°. With respect to a nearly horizontal adjustment travel, which corresponds to an angular range of 0° in the open position of the tilt element and 180° in the closed position, the adjustment path of the coupling point usefully covers an angular region of approximately 180°. In the closed position of the tilt element, even when the 180° dead center point is exceeded only slightly, a reliable locking position of the lever mechanism, and hence of the drive device, is achieved. In the open position, too, a dead center in terms of force is reliably exceeded when the angle of opening is at least slightly greater than 0° there.

The advantages achieved with the invention are, in particular, that both left-hand and right-hand installation of the same drive unit are made possible combined with especially small axial installed width, firstly as a result of an external toothing of an output gear of a spur gear drive with at least two tooth sections of different axial tooth face width, and secondly as a result of a symmetrical arrangement of a tilt lever articulated on the output gear along a plane or axis of mirror symmetry. In this way, automatic closing of the tilt element, in particular automatic travel for both vent windows in the rear passenger compartment, is achieved in the motor vehicle with low component variety.

Furthermore, as a result of the deliberate use of the comparatively large tooth face width of the output gear in the highly loaded external toothing region, which is to say when a vent window is moved into a closure seal, adequate closing force is possible even with the use of an electric motor with comparatively low power. Moreover, it is possible to make the output gear of plastic, which results in an overall weight reduction of the drive device as compared to a metal version.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
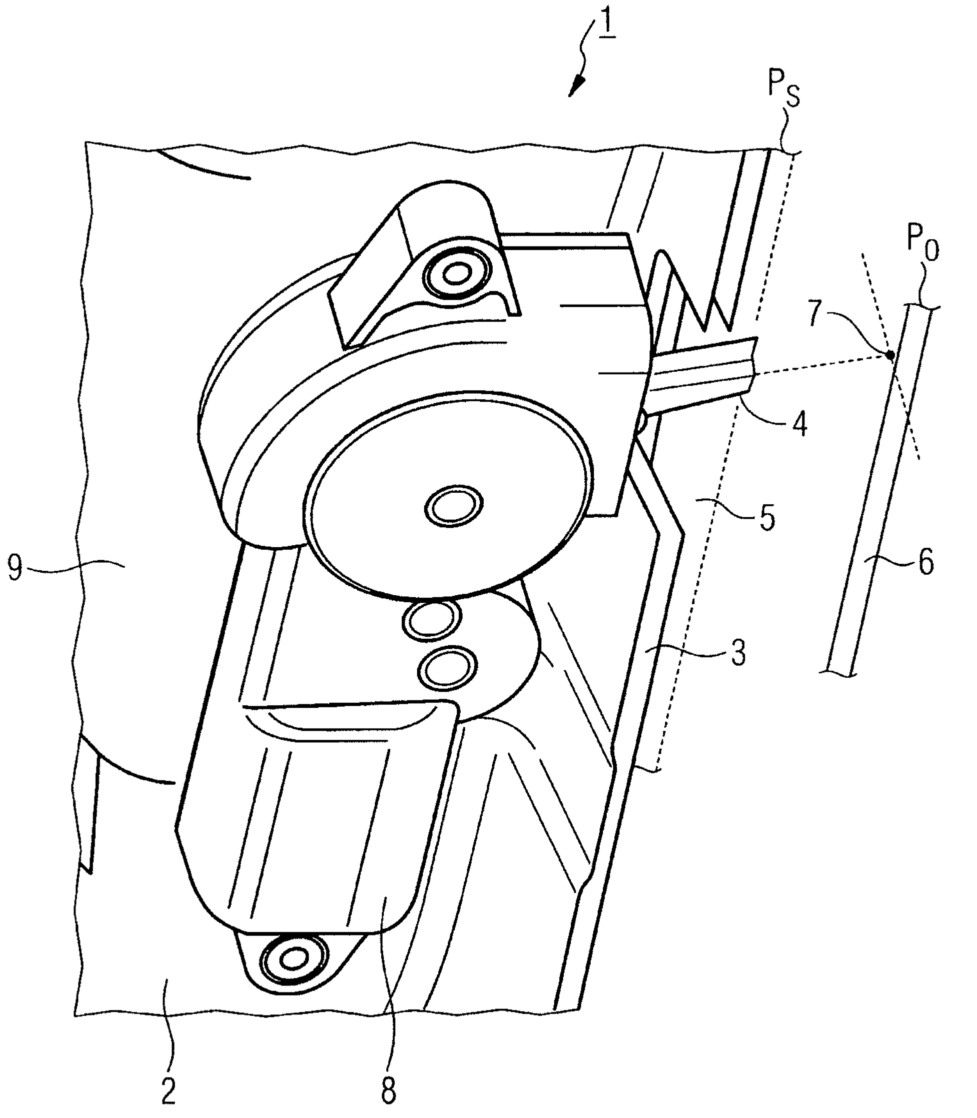
FIG. 1 is a perspective view of an electric motor drive device with a tilt lever projecting from a housing.

Corresponding parts are labeled with the same reference characters in all figures.

FIG. 1 shows the drive device 1 with, for example, a double-shell, closed housing in its installation position in a motor vehicle body 2, for example in the vicinity of the C-pillar or D-pillar, in a flange area 3 of a side panel or door frame in the rear passenger compartment of the motor vehicle. A tilt lever 4 of the drive device 1 is conducted to the outside through a flange opening 5 to a tilt element 6, for example in the form of a vent window articulated on one side to the vehicle body 2, where it is conducted to a retention and/or articulation point 7. The drive device 1 comprises an electric motor 8, concealed behind a housing outline in FIG. 1, which, by means of a likewise concealed multistage gear reducer 9, drives the tilt lever 4 between a closed position $P_S$ and an open position $P_O$ of the vent window 6.

Figure 2:
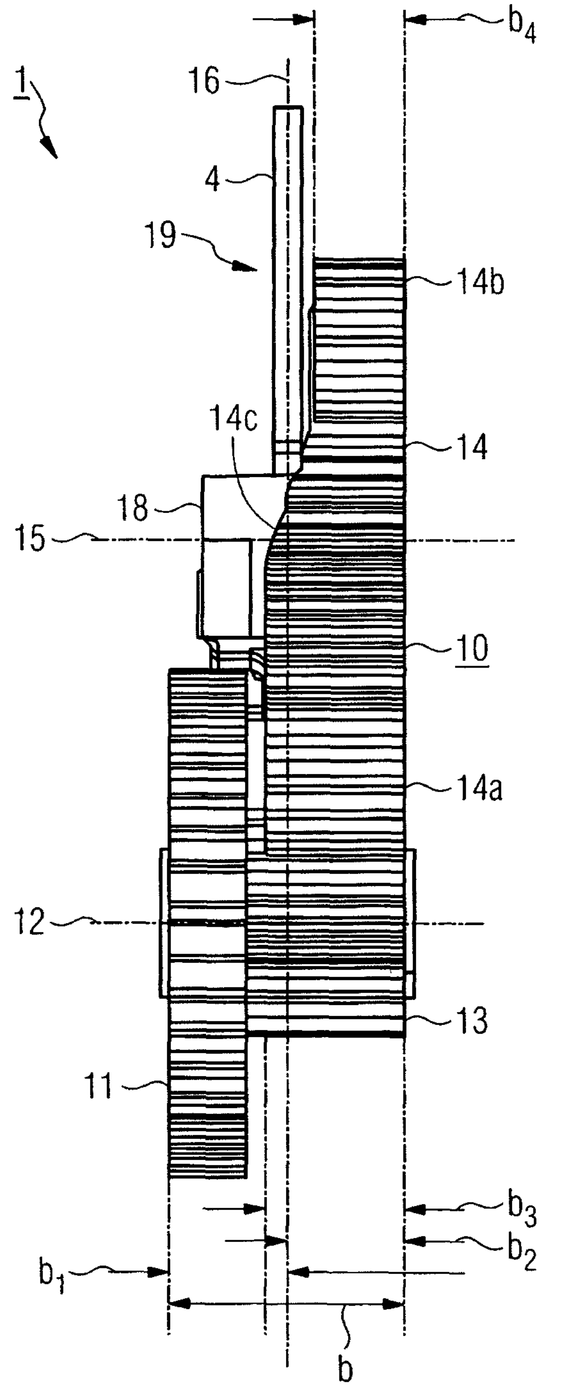
FIG. 2 is a side view of a spur gear drive of the drive device from FIG. 1 with tilt lever articulated on an output gear with differing axial tooth face width.

FIG. 2 shows a spur gear drive 10 and an intermediate gear 11 of the gear reducer 9 of the drive device 1. The intermediate gear 11 rotates about an axis of rotation 12, upon which sits a pinion or spur gear 13 of the spur gear drive 10. The spur gear 13 is permanently connected to, in particular is molded onto, the intermediate gear 11 that is coaxial therewith. An output gear 14 of the spur gear drive 10 rotates about an axis of rotation 15, which extends parallel to the axis of rotation 12 of the intermediate gear 11 and of the spur gear 13 coaxial therewith. The tilt lever 4 extends in a plane of symmetry (axis of mirror symmetry) 16 of the spur gear drive 10 that is transverse to the axes of rotation 12 and 15, and hence is located precisely in the center of its axial drive width b. The half of the axial drive width $b_1$ of the spur gear drive 10 on the left side of the plane of symmetry 16 in the figure is thus the same as the half of the axial drive width $b_2$ of the spur gear drive 10 on the right side of the plane of symmetry 16. The intermediate gear 11 is located on the left side of the plane of symmetry 16, while the output gear 14 is located essentially on the right side of the plane of symmetry. On the side of the plane of symmetry 16 facing away from the intermediate gear 11, the output gear 14 is aligned with the spur gear 13, and thus does not project past it.

As is evident in conjunction with FIG. 3 through 7, the output gear 14 has external toothing with two tooth sections 14*a* and 14*b* of different axial tooth face widths $b_3$ and $b_4$. The first tooth section 14*a*, with the comparatively large tooth face width $b_3$, projects slightly past the plane of symmetry 16 toward the intermediate gear 11 on the left side of the drive. The second tooth section 14*b* with the comparatively small tooth face width $b_4$ is located entirely on the right side of the plane of symmetry 16. The first tooth section 14*a* and the second tooth section 14*b* transition into one another through a third tooth section 14*c*, whose axial tooth face width decreases continuously (linearly) from the first tooth section 14*a* to the second tooth section 14*b*.

Figure 3:
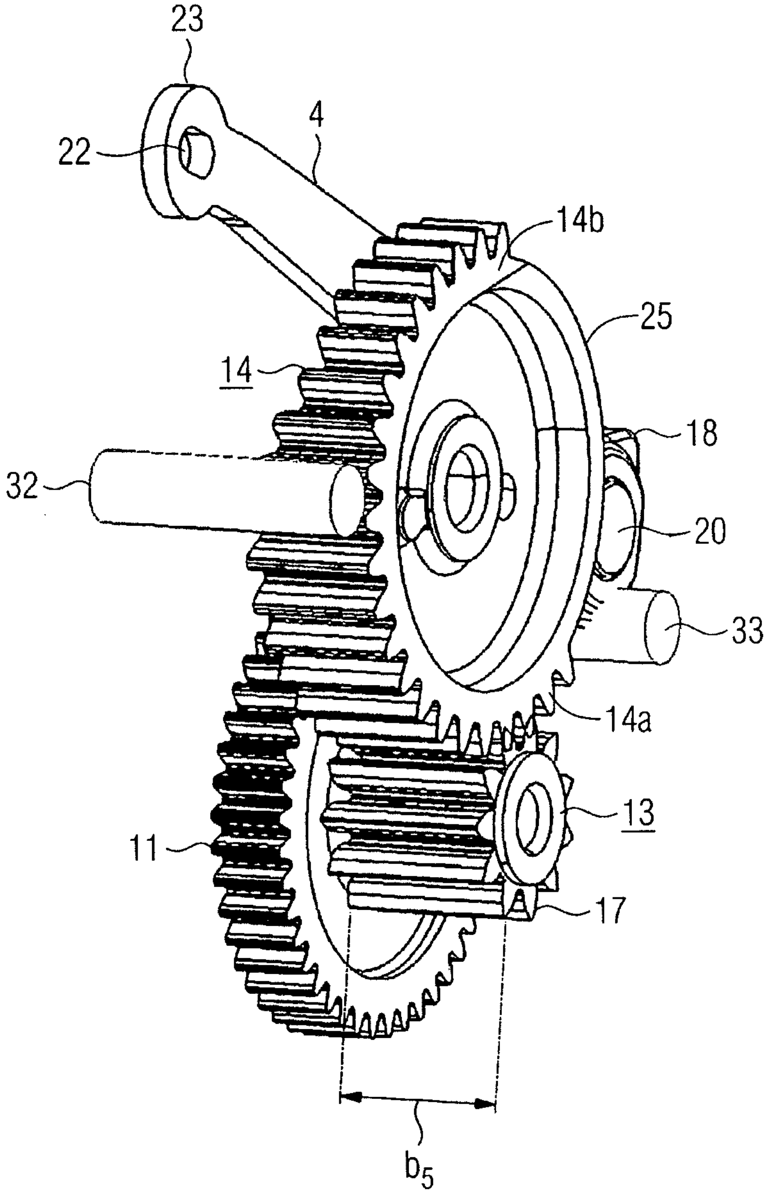
FIG. 3 is a perspective view of the spur gear drive with a view of the spur gear and stop in a first adjustment position (closed position)
Figure 4:
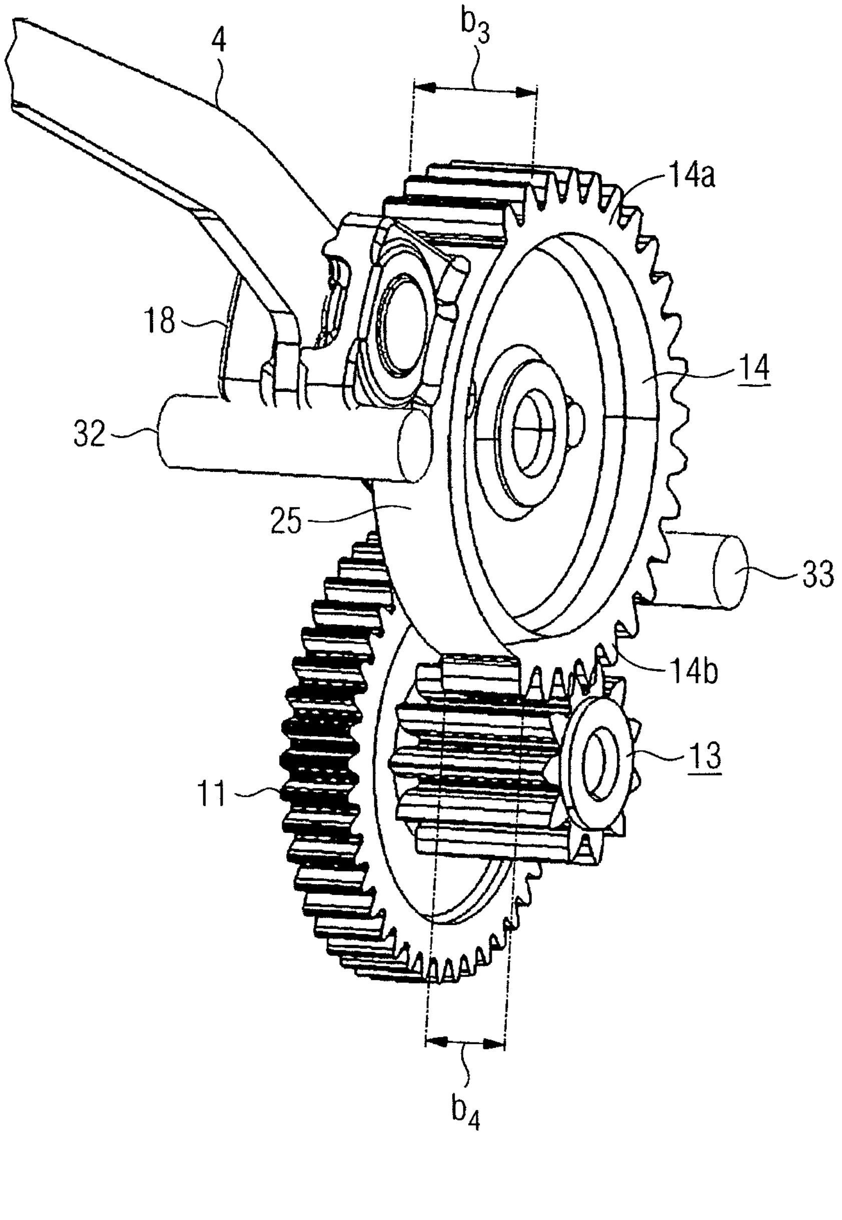
FIG. 4 illustrates in a representation as in FIG. 3, the spur gear drive with stop in a second adjustment position (open position)
Figure 5:
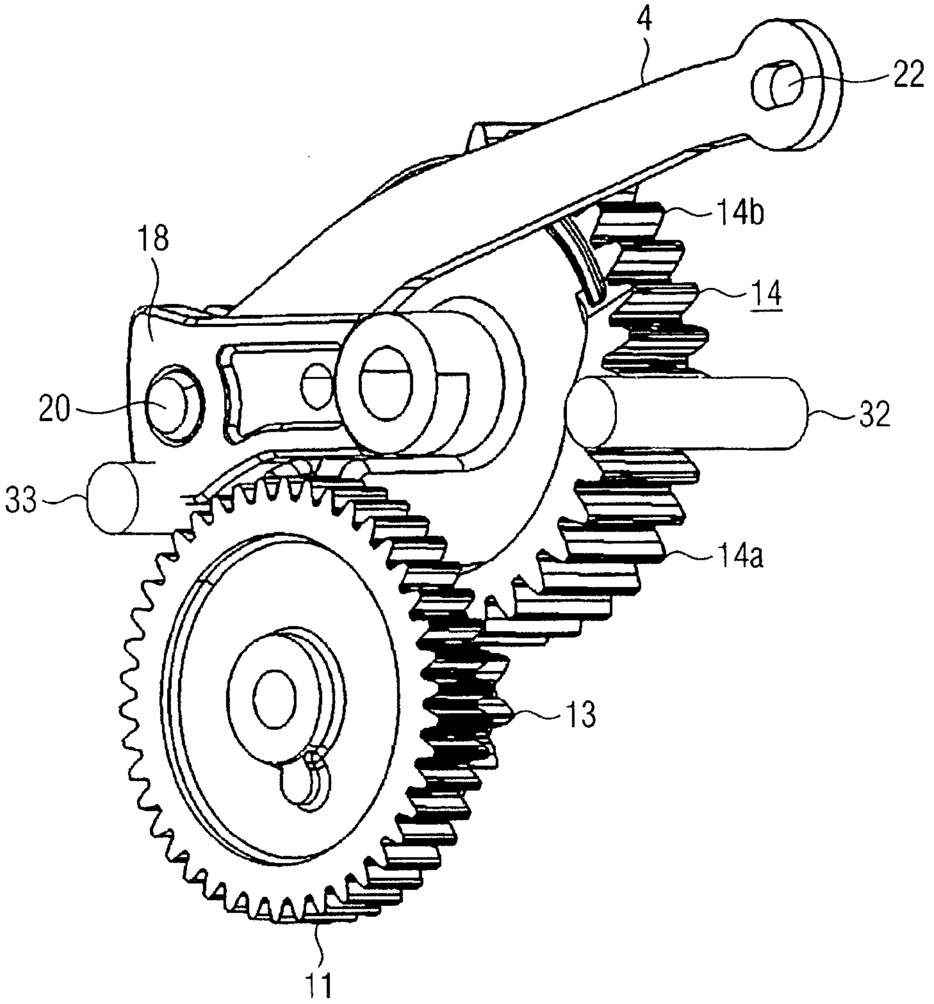
FIG. 5 is a perspective view of the spur gear drive with a view of an intermediate gear and stop in the closed position.
Figure 6:
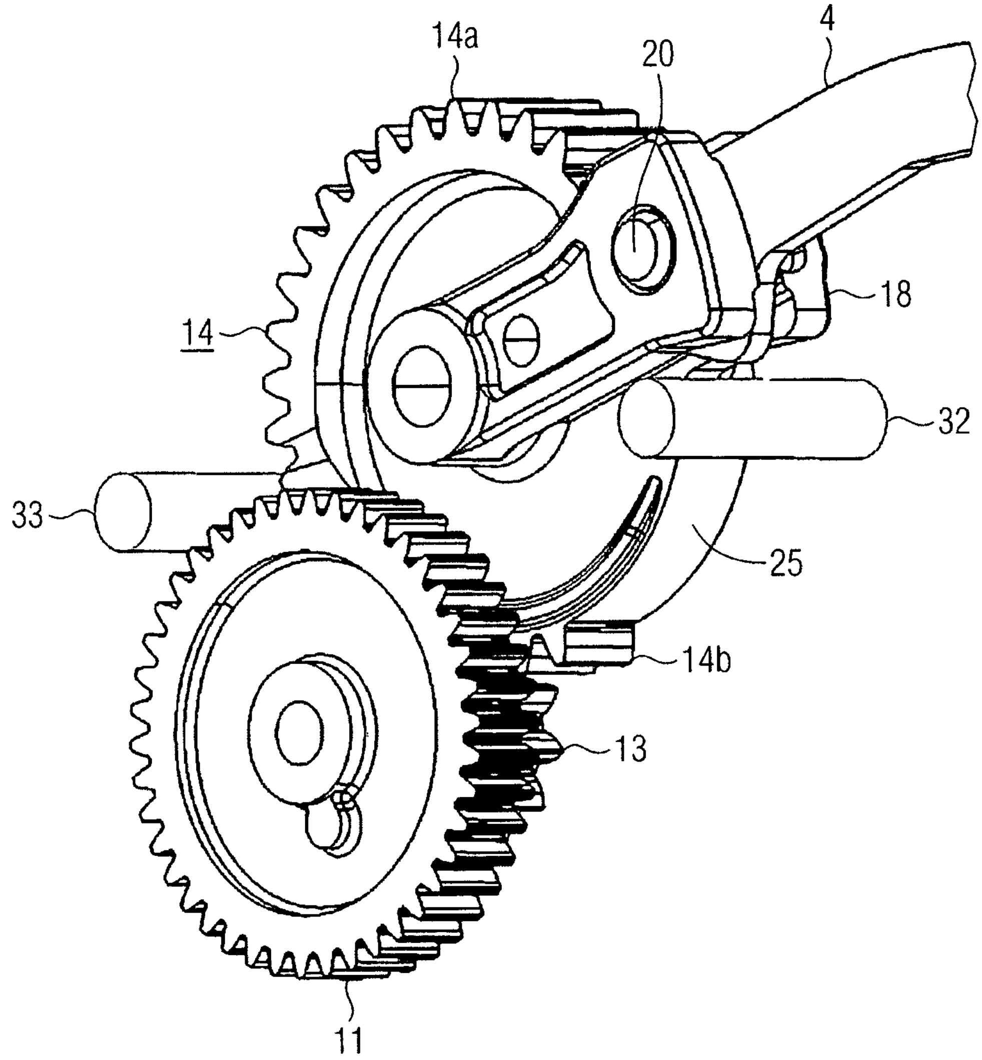
FIG. 6 illustrates in a representation as in FIG. 4, the spur gear drive with stop in the open position.
Figure 7:
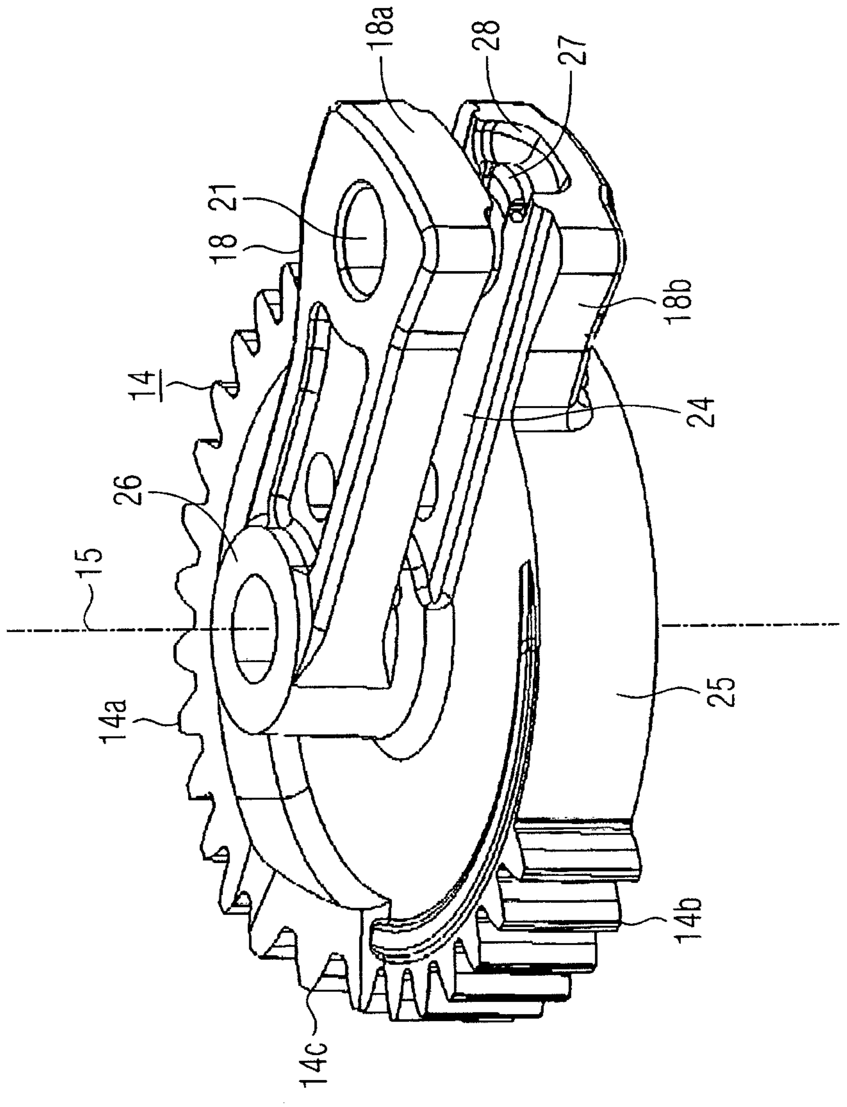
FIG. 7 is a perspective view of the output gear with molded-on coupling lever and bearing eye.
Figure 8:
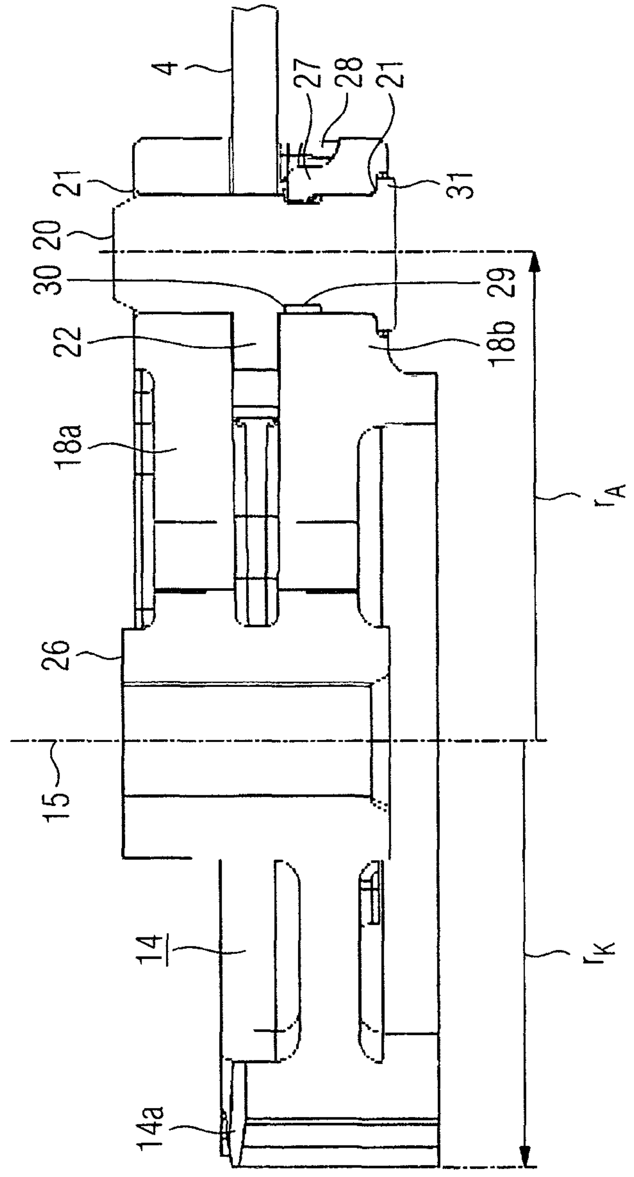
FIG. 8 is a cross-sectional view of the output gear with mounting stud for the tilt lever snap-fitted in the bearing eye.

In the representations shown in FIGS. 2, 3, and 5, the output gear 14, by means of its first tooth section 14*a* with comparatively large tooth face width $b_3$, is engaging the spur gear 13 and meshing with its external teeth 17 over at least approximately its entire axial tooth face width $b_5$ (FIG. 3).

In this drive position, the adjustment lever 4 coupled to a coupling lever 18 of the output gear 14 is located in an intermediate free space 19 formed on account of the comparatively narrow axial tooth face width $b_4$ of the second tooth section 14*b* of the output gear 14; the axial width of this intermediate free space is determined by the difference between the two tooth face widths $b_3$ and $b_4$. As a result, the axial drive width b of the spur gear drive 10 is especially small and minimized to all intents and purposes, while at the same time the spur gear drive 10—and hence the drive device 1—has a mirror-symmetric construction. This, in turn, results in the drive device 1 having an especially small installation space requirement.

As is evident relatively clearly from FIG. 5 through 8, the coupling of the tilt lever 4 to the coupling lever 18 is accomplished by means of a mounting stud 20. For this purpose, the stud extends through a bearing eye 21 of the coupling lever 18 and through a bearing eye 22 aligned therewith that suitably is implemented as an elongated hole of the tilt lever 4. In conjunction with the bearing eyes 21 and 22, the mounting stud 20 forms the bearing or coupling point between the coupling lever 18 and the tilt lever 4. The radial distance $r_A$ of the coupling point 20, 21, 22 from the axis of rotation 15 of the output gear 14 is greater than its crown circle radius $r_K$, so that the coupling point 20, 21, 22, and hence the coupling lever 18 molded on the output gear 14, projects at least slightly past the output gear 14 on the circumferential side.

To accommodate the tilt lever 4 or its bearing head 23 at the free end with the bearing eye 22, the coupling lever 18 is composed of a first coupling lever arm 18*a* and a second coupling lever arm 18*b* opposite thereto at a distance, forming a receiving slot 24 for the tilt lever 4. In this design, the second coupling lever arm 18*b* is essentially molded onto a toothless circumferential section 25 of the output gear 15. The retaining end of the first arm 18*a* facing away from the bearing eye 21 is molded onto a cylindrical bearing sleeve 26 for a bearing shaft, not shown, of the output gear 14. The edge-side plane of the recessed, narrow tooth section 14*b* of the output gear 14 lies essentially in the plane formed by the coupling lever wall or arm wall on the slot side of the arm 18*b* of the coupling lever 18 (FIG. 7) formed on the toothless circumferential section 25 of the output gear 14. This plane delimits the intermediate free space 19 on the right side of the drawing in FIG. 1.

One of the coupling lever arms, which in the exemplary embodiment is the second coupling lever arm 18*b* of the coupling lever 18, has a hollow 28 forming a clamping tab or detent cam 27. In the latched or snap-fitted state of the mounting stud 20 shown in FIG. 8, this detent cam 27 engages in an annular groove 29 of the mounting stud 20 and interlocks a shoulder or detent contour 30 of the mounting stud 20 formed by the annular groove 28. This detent or snap-fit mechanism permits especially simple installation of the tilt lever 4 in the coupling or articulation point between the tilt lever 4 and the coupling lever 18 produced by the bearing eyes 21, 22 and the stud 20. A supporting collar 31 of the mounting stud 20 formed on the stud end opposite the shoulder contour 30 of the annular groove 29 is located at the edge of the opening of the bearing eye 21 when the stud is in its detent position, and thus forms a second bearing or attachment point of the mounting stud 20 in the bearing eye 21 of the coupling lever 18 in addition to the interlock of the detent cam 27 with the shoulder contour 30 of the annular groove 29.

In FIG. 3 through 6, rod-like or cylindrical, mechanical damping elements 32, 33 can be seen. The damping elements 32, 33, which are fixed in the housing, damp an impact of the coupling lever 18, which projects radially past the output gear 14, in the vicinity of the bearing point 20, 21, 22 defined by the mounting stud 20 in the open position $P_O$ or in the closed position $P_S$ of the vent window 6. The mechanical damping elements 32, 33, which are made of a soft, elastic plastic material for example, thus permit noiseless contact of the tilt lever 4 in the end positions $P_O$ and $P_S$ of the vent window 6.

As a result of the mirror-symmetric construction of the spur gear drive 10 and of the intermediate gear 11 as well as of the tilt lever 4 with its position inside the plane of symmetry 16, the drive device 1 can be installed in both the left-hand and right-hand vehicle sides in order to automatically actuate the corresponding vent window 6 there. The implementation of the bearing eye 22 of the tilt lever 4 as an elongated hole permits, for example, a tolerance-related compensation of motion during the adjustment motion of the tilt lever 4. The tilt lever's bearing point 20, 21, 22 on the coupling lever 18 traverses a circular path during an adjustment motion between the open position $P_O$ and the closed position $P_S$ while passing over an angular range from greater than or equal to 0° to less than or equal to 200°, preferably approximately 180°.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drive device for a tilt element of a motor vehicle that is motor-drivable between an open position and a closed position, the drive device comprising:

an electric-motor driven spur gear drive that comprises an output gear with a coupling lever for rotary coupling of a tilt lever;

a spur gear meshing with the output gear; and an intermediate gear that is coaxial with the spur gear, wherein the output gear has external teeth with a first tooth section and with an adjoining second tooth section whose axial tooth face width is smaller than the axial tooth face width of the first tooth section, and wherein the tilt lever, which is connectable to the coupling lever, is located in a plane of symmetry that is substantially perpendicular to the axes of rotation of the spur gear drive.

2. The drive device according to claim 1, wherein the spur gear and the intermediate gear are connected to one another on a shared axis of rotation parallel to the axis of rotation of the output gear.

3. The drive device according to claim 1, wherein the output gear has a toothless circumferential section.

4. The drive device according to claim 1, wherein the axial tooth face width of the spur gear is greater than or equal to the axial tooth face width of the first tooth section.

5. The drive device according to claim 1, wherein the spur gear is aligned with the output gear on a side facing away from the intermediate gear.

6. The drive device according to claim 1, wherein a radial distance of the coupling point between the coupling lever and the tilt lever from the axis of rotation of the output gear is greater than its crown circle radius.

7. The drive device according to claim 1, wherein the coupling lever has, in a region of the axis of rotation of the output gear, a first arm molded thereon, and a second arm separated from the first one while forming a receiving slot for the tilt lever.

8. The drive device according to claim 1, wherein, in order to couple the tilt lever to the coupling lever in a rotatable manner, a mounting stud is provided that is latched in a bearing eye of the coupling lever.

9. The drive device according to claim 8, wherein the coupling point between the coupling lever and the tilt lever is conducted along a semicircular adjustment path between a first stop associated with the open position and a second stop associated with the closed position.

10. The drive device according to claim 1, wherein the stops are composed of mechanical damping elements.

11. The drive device according to claim 9, wherein the second tooth section of the output gear is recessed with respect to the first tooth section in a region that is passed over by the tilt lever between the stops.

12. The drive device according to claim 11, wherein an edge-side plane of the recessed tooth section lies essentially in the plane formed by a wall of the receiving slot of the arm.

13. The drive device according to claim 1, wherein the comparatively wide first tooth section is in engagement with the associated spur gear when the tilt element is in its closed position.

14. The drive device according to claim 1, wherein the tilt element is for a pivoting vent window.

* * * * *